(12) United States Patent
Bean et al.

(10) Patent No.: US 12,103,662 B2
(45) Date of Patent: Oct. 1, 2024

(54) INCEPTOR AND METHOD

(71) Applicant: BAE SYSTEMS plc, London (GB)

(72) Inventors: Jason Howard Bean, Rochester (GB); Justin Mark Dee, Rochester (GB)

(73) Assignee: BAE SYSTEMS PLC, London (GB)

( * ) Notice: Subject to any disclaimer, the term of this patent is extended or adjusted under 35 U.S.C. 154(b) by 433 days.

(21) Appl. No.: 17/625,953

(22) PCT Filed: Jun. 18, 2020

(86) PCT No.: PCT/GB2020/051477
§ 371 (c)(1),
(2) Date: Jan. 10, 2022

(87) PCT Pub. No.: WO2021/005329
PCT Pub. Date: Jan. 14, 2021

(65) Prior Publication Data
US 2022/0242554 A1    Aug. 4, 2022

(30) Foreign Application Priority Data

Jul. 11, 2019 (GB) ..................................... 1909962
Sep. 3, 2019 (EP) ..................................... 19195209

(51) Int. Cl.
*B64C 13/10* (2006.01)
*B64C 13/04* (2006.01)
(Continued)

(52) U.S. Cl.
CPC .......... *B64C 13/10* (2013.01); *B64C 13/0421* (2018.01); *G05G 1/015* (2013.01);
(Continued)

(58) Field of Classification Search
CPC .... B64C 13/10; B64C 13/0421; G05G 1/015; G05G 2009/04766; G05G 2505/00;
(Continued)

(56) References Cited

U.S. PATENT DOCUMENTS 4,106,728 A * 8/1978 Griffith ............... B64C 13/0421
244/221
4,236,325 A 12/1980 Hall et al.
(Continued)

FOREIGN PATENT DOCUMENTS

CN    1175017 A    3/1998
EP    3023794 A2   5/2016
(Continued)

OTHER PUBLICATIONS

International Search Report and Written Opinion received for PCT Application No. PCT/GB2020/051473. Mail date: Aug. 11, 2020. 9 pages.
(Continued)

*Primary Examiner* — Aaron L Troost
*Assistant Examiner* — Patrick Daniel Mohl
(74) *Attorney, Agent, or Firm* — Finch & Maloney PLLC

(57) ABSTRACT

A method to detect a hands off status of a user input device is disclosed. The method comprising filtering a sensed force, acting on the user input device, using a first lag filter to provide a first output, the lag filter comprising a first lag time constant. Filtering the sensed force using a second lag filter, substantially in parallel with the first filter, to provide a second output, the second lag filter comprising a second lag time constant greater than the first lag time constant. Comparing with a first threshold value, in a first comparison, a magnitude of a difference between the first output and the second output. Comparing with a second threshold value, in a second comparison, a magnitude of the second output. Designating the user device to have a hands off status based on the first comparison and the second comparison.

19 Claims, 7 Drawing Sheets

(51) Int. Cl.
  *G05G 1/015*  (2008.04)
  *G05G 9/047*  (2006.01)
(52) U.S. Cl.
  CPC ............ *G05G 2009/04766* (2013.01); *G05G 2505/00* (2013.01)
(58) Field of Classification Search
  CPC .......... G05G 2009/04774; G05G 1/04; G05G 2009/04762; G05G 9/047; G06F 3/016; G06F 3/0346
  See application file for complete search history.

(56) References Cited

U.S. PATENT DOCUMENTS

| | | | |
|---|---|---|---|
| 5,532,476 A | 7/1996 | Mikan | |
| 5,734,373 A | 3/1998 | Rosenberg et al. | |
| 5,979,835 A * | 11/1999 | Najmabadi | G05D 1/0833 |
| | | | 701/8 |
| 6,342,880 B2 | 1/2002 | Rosenberg et al. | |
| 6,580,418 B1 | 6/2003 | Grome et al. | |
| 7,432,908 B2 | 10/2008 | Rutledge et al. | |
| 7,757,579 B2 | 7/2010 | Bloch | |
| 8,345,004 B1 | 1/2013 | Kass et al. | |
| 9,156,546 B2 | 10/2015 | Irwin, III et al. | |
| 11,755,056 B2 | 9/2023 | Bean et al. | |
| 2006/0007181 A1 | 1/2006 | Jung et al. | |
| 2007/0055433 A1* | 3/2007 | Yamaguchi | B60T 8/48 |
| | | | 701/90 |
| 2011/0050563 A1 | 3/2011 | Skutt | |
| 2012/0150347 A1* | 6/2012 | Ohga | B25J 9/1633 |
| | | | 700/254 |
| 2014/0288731 A1* | 9/2014 | Hagerott | B64C 13/341 |
| | | | 701/3 |
| 2015/0025745 A1* | 1/2015 | Tamura | B62D 6/00 |
| | | | 701/41 |
| 2015/0130730 A1 | 5/2015 | Harley et al. | |
| 2016/0004270 A1 | 1/2016 | Taylor et al. | |
| 2017/0242444 A1 | 8/2017 | Eggold et al. | |
| 2017/0367773 A1 | 12/2017 | Kottenstette et al. | |
| 2020/0103897 A1 | 4/2020 | Thornberg et al. | |
| 2022/0075385 A1* | 3/2022 | Yamamoto | G05D 1/243 |
| 2022/0244754 A1 | 8/2022 | Bean et al. | |

FOREIGN PATENT DOCUMENTS

| | | | | |
|---|---|---|---|---|
| GB | 2549272 A | 10/2017 | | |
| GB | 2587469 A | 3/2021 | | |
| WO | WO-2020138471 A1 * | 7/2020 | ........... | B60W 30/10 |
| WO | 2021005328 A1 | 1/2021 | | |
| WO | 2021005329 A1 | 1/2021 | | |

OTHER PUBLICATIONS

GB Search Report under Section 17(5) received for GB Application No. 1909963.9, dated Jan. 13, 2020. 3 pages.
Extended European Search Report received for EP Application No. 19195273.8, dated Jan. 23, 2020. 7 pages.
International Preliminary Report on Patentability received for PCT/GB2020/051477, dated Jan. 20, 2022. 13 pages.
International Preliminary Report on Patentability received for PCT/GB2020/051473, dated Jan. 20, 2022. 8 pages.
International Search Report and Written Opinion received for PCT Application No. PCT/GB2020/051477. Mail date: Sep. 15, 2020. 17 pages.
GB Search Report under Sections 17 and 18(3) received for GB Application No. 2009323.3, dated Dec. 11, 2020. 6 pages.
GB Search Report under Sections 17 and 18(3) received for GB Application No. 2109820.7, dated Nov. 5, 2021. 5 pages.
GB Search Report under Section 17(5) received for GB Application No. 1909962.1, dated Jan. 8, 2020. 4 pages.
Extended European Search Report received for EP Application No. 19195209.2, dated Apr. 17, 2020. 12 pages.

* cited by examiner

INCEPTOR AND METHOD

BACKGROUND

Active inceptors provide force feedback to an operator of a user input device through internally simulating a feel model, one example being a mass-spring-damper (MSD) system, and driving an actuated mechanism to mimic the dynamic performance of the feel model.

DETAILED DESCRIPTION

Force feedback control loops within active inceptor systems may use a number of sensors, namely force and/or position sensors. Typically the force sensor is the primary pilot input device or is coupled to the primary pilot input device. The output of a sensor, such as a force sensor may drift slowly over time in response to changing environmental conditions, such as changing humidity or temperature. Typically the environmental offsets will appear over tens of minutes, although this will depend on both the type of sensor and the environmental conditions. The drift in output may cause a deterioration in the response of the active inceptor system, such as an offset in sensed or actual position, or an erosion of the deadband force (for example a breakout force).

Ideally the offset should be removed. If the active inceptor system is not able to identify whether it is the user applying the drift or an environmental effect then the performance of the active inceptor system will be limited, as removing the pilot force rather than environmental offset may result in the pilot to providing more force to the user input device, changing the feel of the device.

To help address this problem the hands off status of a user input device may be detected, which indicates whether the user is hands off the user input device or not. If the user is hands off then a series of filters may be applied to the sensed force to remove the force offset whilst being imperceptible to the user.

Figure 1:
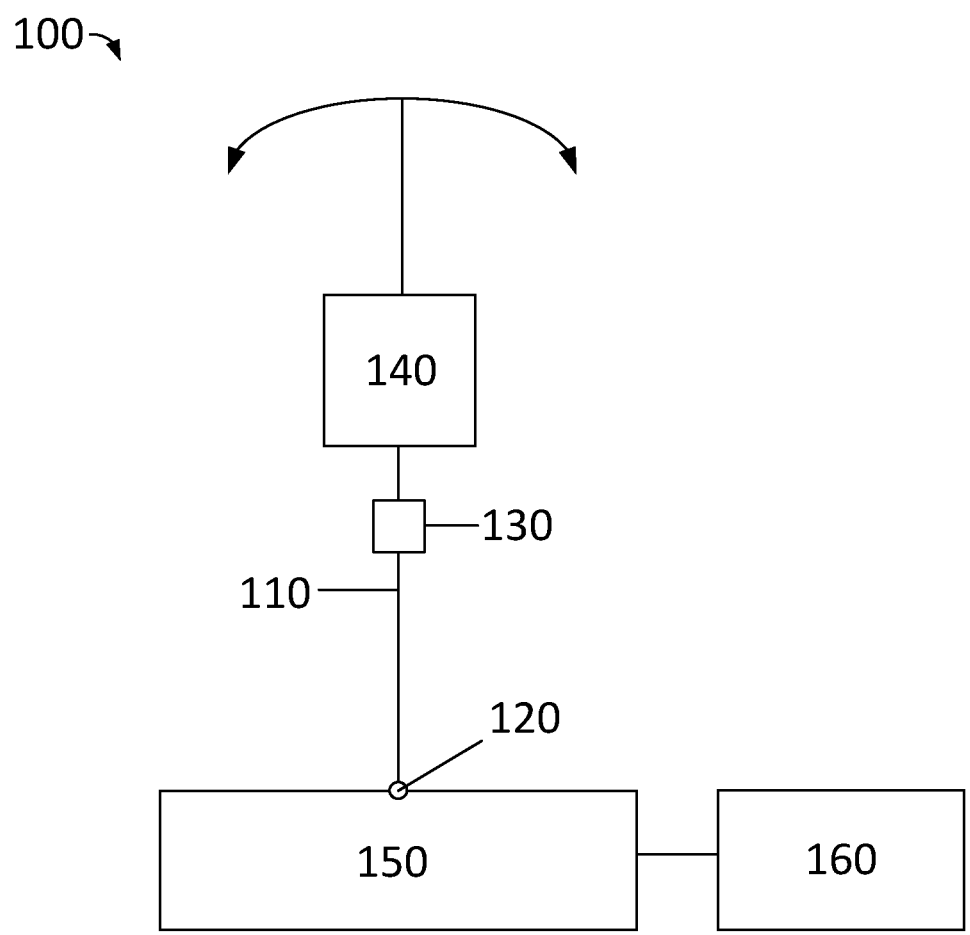
FIG. 1 illustrates an active inceptor system according to some examples.

FIG. 1 illustrates an active inceptor system 100 in accordance with some examples. Active inceptor system 100 comprises a user-input device 110, a pivot 120, a force sensor 130, grip portion 140, motor mechanism 150 and filtering component 160.

The user input device 110 is configured to pivot about pivot 120 in at least one direction. The user input device 110 may be a stick, an inceptor, or throttle. The user input device 110 may have any shape. The grip portion 140 may be the part of the user input device 110 that is designed for the user to hold. Grip portion 140 may also be merely a portion of user input device 110 that has a different mass or profile than the rest of the user input device 110.

Motor mechanism 150 is configured to provide a force to the user input device 110 according to a force response model, such as the mass-spring-damper MSD model. The force is calculated using filtering component 160.

Force sensor 130 is illustrated as being coupled to the user input device 110, however it may be positioned in any location that still enables the user input force to be determined. For example, it may be located on the grip portion 140, the user input device 110, pivot 120 or motor mechanism 150.

In some examples the filtering component 160 may comprise circuitry to detect a hands off status of the user of the user-input device 110. The method to detect the hands off status of the user is described with reference to FIG. 2, and is generally indicated with reference sign 200. The filtering component 160 may also comprise force offset compensation circuitry described in relation to FIGS. 3 and 4.

The sensed force 205, detected by force sensor 130 is filtered using a first lag filter 210 to provide first output 230. Filtering the sensed force 205 with a lag filter adds a delay to the signal such that the first output 230 is a time-delayed version of the sensed force 205. The sensed force 205 is also filtered using a second lag filter 220, substantially at the same time as the first lag filter 210, to provide a second output 240, the second lag filter 220 comprising a second lag time constant greater than the first lag time constant, such that the time delay added by the second lag filter 220 is greater than the time delay added by the first lag filter 210.

The first lag time constant may be 0.09 s and the second lag time constant may be 1.0 s. However, the lag times are not limited to these aforementioned values, and may take any value depending of the particulars of the active inceptor system 100.

A second threshold value, in a second comparison 260, is compared with a magnitude of the second output 240. The second threshold value may be pre-determined and may be equal to the overall washout filter authority (which is the amount of force the filter may remove before it maxes out). In some examples this may be equal to 1.5 lbs total force, however the amount of force will depend on the specific application. The typical overall washout filter authority may be related to the expected maximum drift of the sensor over time, knowledge of where the force sensor is, and the aircraft transient requirements. For example it may be a multiple of the expected maximum drift of the sensor over time, such as one or two times the expected maximum drift of the sensor over time.

In some examples the force sensor is positioned below the grip and so expects directly pilot applied forces in the normal range a human can apply a one armed force i.e. 80 lbs or so. However, other inceptor applications have the force sensor in a linkage which has a gearing from pilot applied force to the linkage, so a pilot applied force of say 10 lbs may map to 50 lbs at the force sensor. So the overall range of this force sensor may be 400 lbs (which maps to 80 lbs at the pilot force application point). In this case the washout authority may be 7.5 lbs (i.e. five times the expected maximum drift of the sensor over time).

Also generally it is assumed that the force sensor used in the active inceptor system 100 may have a force sensor drift of less than approximately 1.25% of full scale of the force sensor. This may be taken into consideration when determining the maximum washout authority.

Finally, with regard to aircraft transient requirements, it may also be taken into account the impact of if the washout goes wrong (and removes or adds force continually). For example, what sort of constant offset force can the aircraft and pilot tolerate to be able to fly the aircraft safely.

A first threshold value, in a first comparison 250, is compared with a magnitude of a difference between the first output 230 and the second output 240. The first threshold value may be pre-determined and equal to a small noise threshold, for example 3% of the second threshold value, however the amount of force will depend on the specific application. In some examples the first threshold value may be within 2% to 10% of the second threshold value.

The hands off status of the user is designated 270 based on the first comparison 250 and the second comparison 260. In some examples the hands off status may be designated to be hands off if the magnitude of the difference between the first output 230 and the second output 240 is less than the first threshold value, and the magnitude of the second output 240 is less than the second threshold value The method 200 described in essence detects user hands off by checking that the absolute force is below a certain value in the second comparison 260, and that it is not changing with time, in the first comparison 250.

Although the method is described with reference to lag filters, it is to be understood that alternative methods and/or filters could be used to achieve the same effect.

In some examples the method 200 may additionally comprise monitoring the hands off status for a predetermined time period, and declaring a steady state status if the user is designated to have a hands off status for the entire predetermined time period. The predetermined time period may 0.5 s. This may be useful as it may be advantageous to know that the user is hands off for an extended period, rather than merely briefly.

In some examples a redundant channel of an active inceptor system 100 may be monitored to provide an independent determination of the hands off status, which may add extra redundancy to the system, and reduce the chance of false positives. An active inceptor system 100 may have redundant channels comprising multiple force sensor channels. This provides redundancy in case one force sensor or channel fails. In some examples the steady state status or hands off status may be set as hands off only if at least two channels indicate that the user is hands off. In some examples the steady state status or hands off status may be set as hands off if and only if no channels indicate that the user is hands on. For example the statuses may be combined using a method similar to an AND gate.

In some examples the steady state status may be designated based on a combination of the hands off status and the independent determination. In some examples the steady state status may only be designated if both the independent determination and determination based on the comparison of the first and second comparisons demonstrate that the user has been hands off for the predetermined time period.

In some examples an action may be performed based on the hands off status or stead state status. The action may comprise at least one of: initiating an autopilot, initiating a force drift compensation, and/or indicating to at least one user that the user of the user input device is hands off.

In some examples the method may be applied to an active inceptor system 100 similar to that described with reference to FIG. 1. However, it is to be understood that the method is not limited to being applied to active inceptor systems, and may be applied to detect a hands off status of any system that comprises a sensor, such as a force sensor, coupled to a user input device.

As stated above, active inceptor systems may drift over time creating an offset in position and/or force. This can be corrected by removing the offset, however if the offset is removed whilst the user is holding the user input device, then the user will be able to feel this, providing a negative experience, for example unwanted shaking or vibration of the user-input device. Therefore, it is advantageous to remove the offset only when the user is hands off the user input device.

Figure 3:
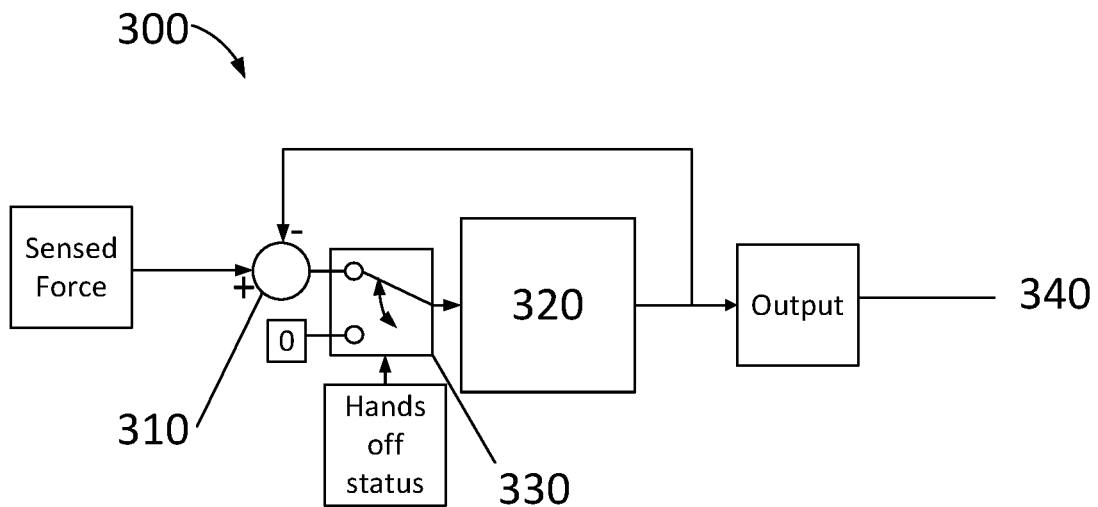
FIG. 3 illustrates circuitry according to some examples.

FIG. 3 illustrates circuitry, indicated with reference sign 300, to calculate the force and/or position offset. The circuitry 300 comprises an integrator 320. The integrator 320 is configured such that the input to the integrator is zero if the user is hands on the user input device. This may comprise receiving an indication that the user is hands on the user input device and setting a value of a component 330 based on the hands off status. Setting the integrator 320 input to be equal to zero freezes the integrator 320 value, turning it off, which allows for a constant force offset to be maintained when the pilot/user makes inputs to the system The circuitry 300 is further configured to subtract from the sensed force the last output 340 of the integrator 320 using subtraction circuitry 310 to provide a first subtraction output. The first subtraction output is used as the input to the integrator 320 if the hands off status indicates that the user is hands off the user input device.

After a predetermined number of cycles of the integrator 320 the output 340 of the integrator 320 is equated to be equal to the force offset.

The component 330 may comprise multiplier circuitry, which multiplies the input to the multiplier from subtraction circuitry 310 by a factor based on the hands off status, where the factor may be zero if the hands off status indicates that the user is hands on, and one if the status indicates that the user is hands off.

The integrator 320 may be limited to the authority of the washout algorithm, for example it may be limited to 1.5 lbs. This limit would be tailored according the requirements of the particular application.

The speed of the integrator 320 may also be regulated through the time constant input to the component 330 (in this example being 0.8 s); the larger the value the faster the integrator 320 will react to its input, and as such the time constant acts as a speed regulator of the integrator. At steady state, the idea is that the integrator output is exactly equal to the sensed force input (which is the offset to be removed). The time constant input to the component 330 controls how frequently the component 330 provides the input to the integrator.

Figure 4:
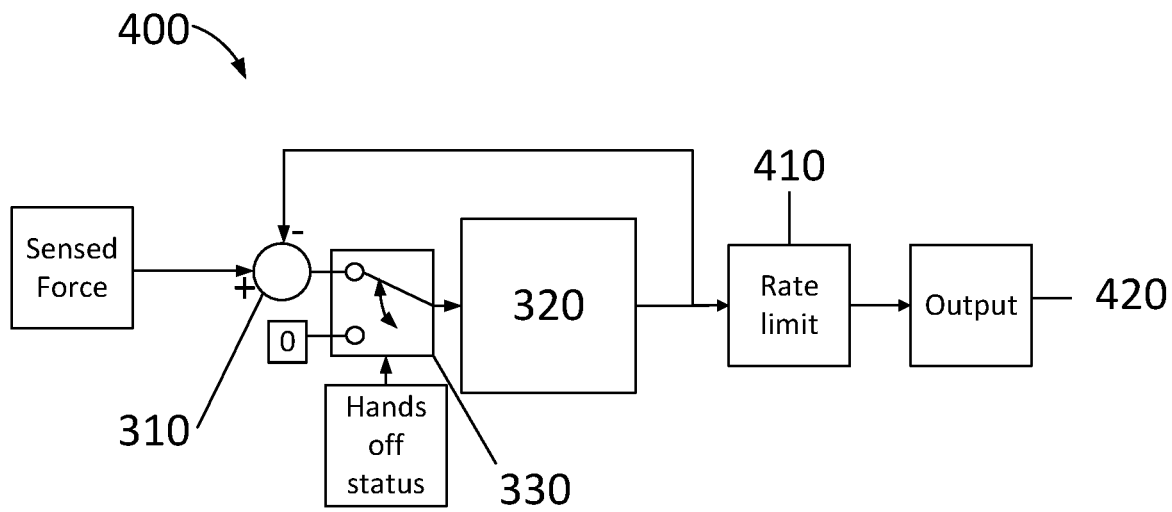
FIG. 4 illustrates circuitry according to some examples.

FIG. 4 illustrates a circuitry according to some examples, illustrated with reference sign 400. The circuitry is the similar to the circuitry described with reference to FIG. 3, except that the circuitry additionally comprises a rate limiter 410. The output 420 may be equated to be equal to the force offset after a predetermined number of cycles of the rate limiter. The rate limiter prevents the output from growing too rapidly, which could result in the offset being removed too abruptly, which would be detectable to the pilot and therefore not favourable. This may because the integrator may reach its optimum output relatively fast (e.g. a few seconds) but the force drift should be removed on a similar timescale to the drift of the sensor, such that the removal is imperceptible to the user. Furthermore, the rate limiter may prevent sudden changes in the output of the integrator having a significant effect on the compensated force.

The rate limiter 410 may iterate from zero output to its input value over 10 s of minutes (if the input is a constant value). The constant may depend on the speed of the expected sensor drift.

The rate limiter 410 may also comprise a first initial rate limit for a first duration, and a second rate limit for a second duration, wherein the first initial rate limit is higher than the second rate limit. This may be set when the active inceptor system first powers up. On initial power up the rate limit may be increased such that the algorithm quickly acquires the initial system offset before the user starts using the system. Following initial power up, the rate limit reverts to the slow time constant. This may avoid the user input device jerking in an unwanted manner at start up.

Figure 5:
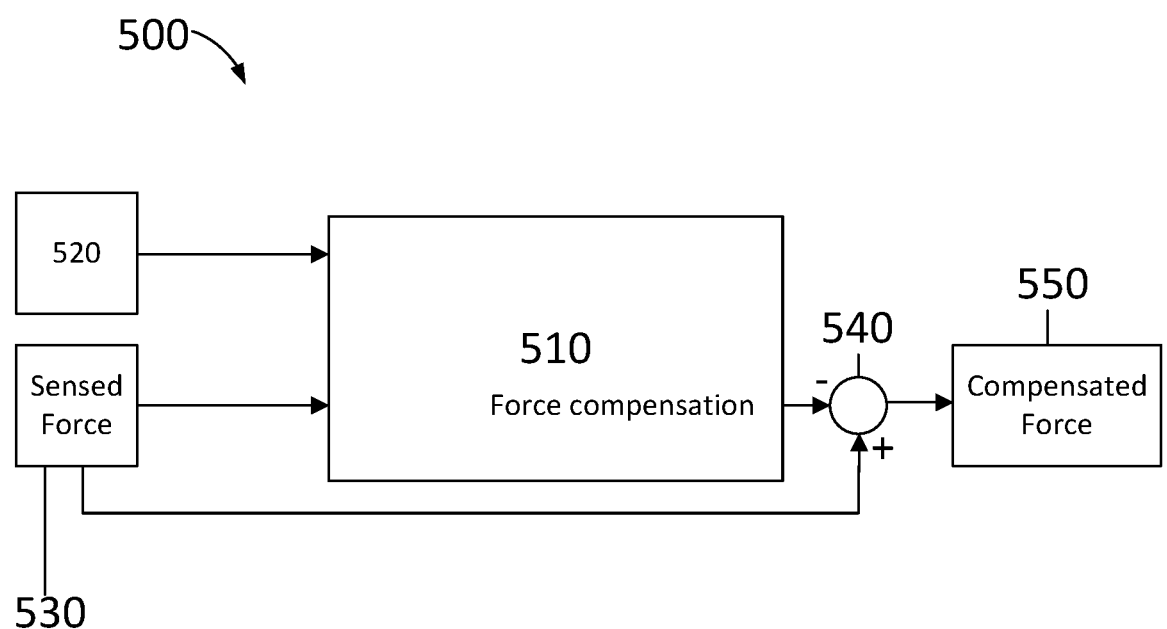
FIG. 5 illustrates circuitry to compensate a calculated force according to some examples.

The circuitry described in relation to FIGS. 3 and 4 may also comprise means to subtract the force offset compensation from the sensed force to obtain a compensated force. This is illustrated in FIG. 5, showing an active inceptor circuitry 500. Active inceptor circuitry 500 comprises a compensation filter 510, hands off status input 520, sensed force input 530, summer 540 and compensated force output 550.

The compensation filter 510 receives as input the sensed force input 530 and hands off status input 520. In some examples, hands off status input 520 may comprise a logical value having a value of one or zero. The value may be one if the user is hands off, and zero if the user is hands on, or vice versa. Alternatively, hands off status input 520 may be one if the user remains hands off for a predetermined period of time (i.e. steady state), and zero if the user has not been hands off for a predetermined period of time, or vice versa. The force compensation may be calculated and added to the sensed force when the user input device is hands off, or in steady state, using summer 540 (i.e. when the hands off status is one). This then provides a compensated force output 550. In some examples the hands off status may be indicated using a method different from a logical value.

Removing the force when the user is hands off assists the circuitry to remove the force offset without the user of the user input device being aware, for example by feeling vibrations or other movements.

Figure 6:
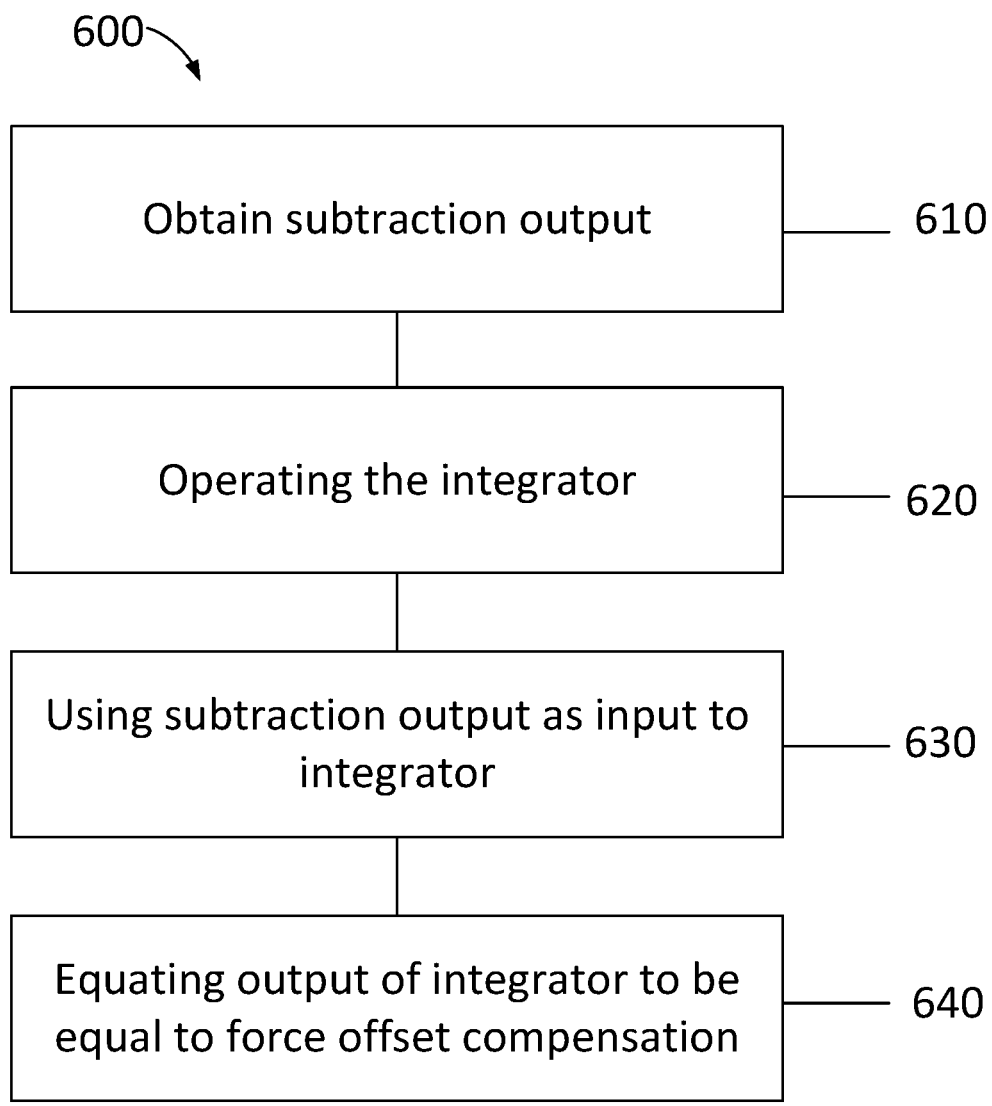
FIG. 6 illustrates a method according to some examples.

FIG. 6 illustrates a method to calculate a force offset compensation in accordance with some examples. The method is indicated with reference sign 600.

The method comprises operating, 610, an integrator, wherein the input to the integrator is zero if an indication is received that the user is hands on the user input device. Subtracting, 620, a last output from the integrator from a sensed force acting on the user input device to obtain a first subtraction output. Using, 630, the first subtraction output as the input to the integrator. Equating, 640, after a predetermined number of cycles of the integrator, the output of the integrator to be equal to the force offset compensation.

Figure 7:
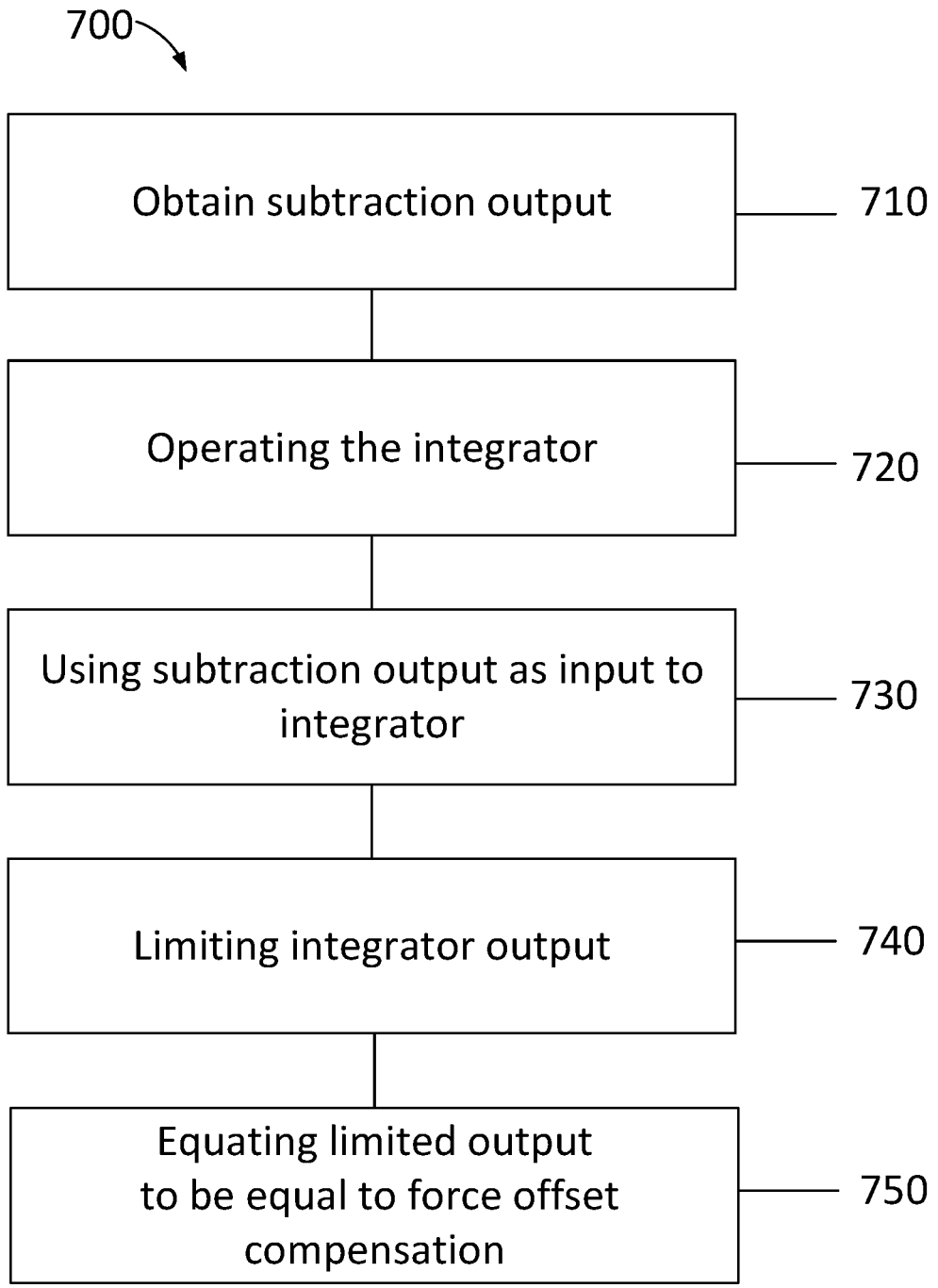
FIG. 7 illustrates a method according to some examples.

FIG. 7 illustrates a method to calculate a force offset compensation in accordance with some examples. The method is indicated with reference sign 700.

The method comprises operating, 710, an integrator, wherein the input to the integrator is zero if an indication is received that the user is hands on the user input device. Subtracting, 720, a last output from the integrator from a sensed force acting on the user input device to obtain a first subtraction output. Using, 730, the first subtraction output as the input to the integrator. Limiting, 740, using a rate limiter the output of the integrator. Equating, 750, after a predetermined number of cycles of the rate limiter, the output of the rate limiter to be equal to the force offset compensation.

Figure 2:
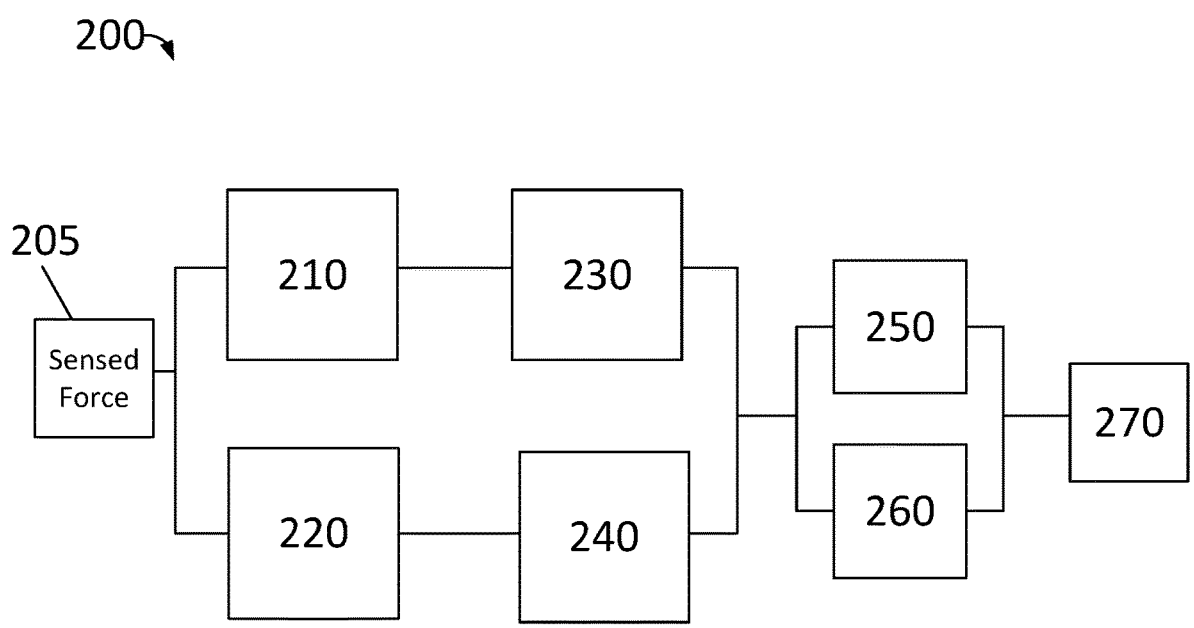
FIG. 2 illustrates a method according to some examples.
Figure 8:
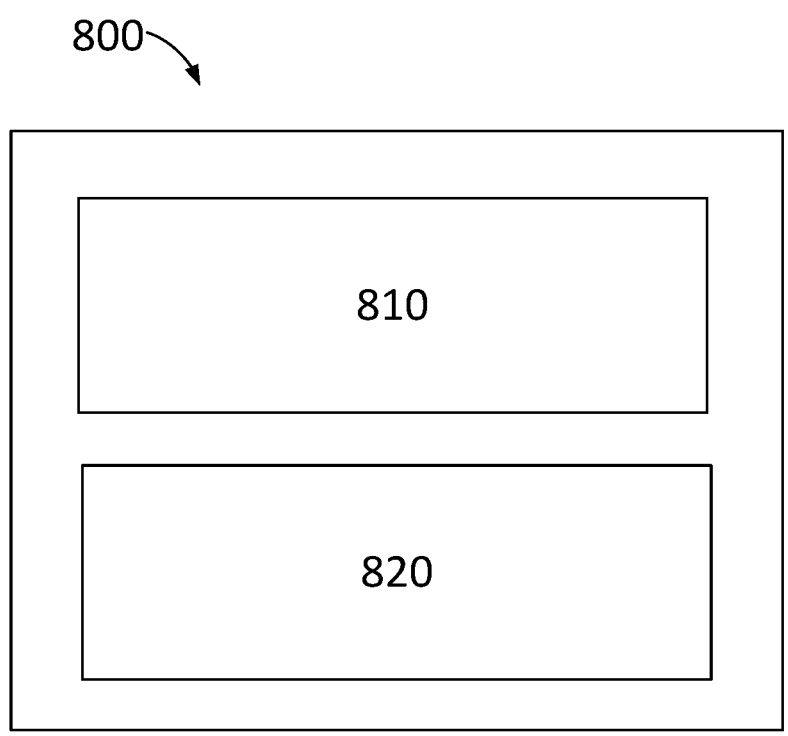
FIG. 8 illustrates a computer readable medium according to some examples.

The methods described with relation to FIGS. 2, 6 and 7 may be stored as instructions on a machine-readable medium 800, that when executed cause a processing means to perform the methods of any of FIGS. 2, 6 and 7. The machine readable medium is indicated illustrated in FIG. 8, and comprises a hands off detection module 810 and a force compensation module 820.

The invention claimed is:

1. A method to detect a hands off status of a user input device, the method comprising:
   obtaining, by a force sensor, a sensed force acting on the user input device;
   filtering the sensed force, acting on the user input device, using a first lag filter to provide a first output, the first lag filter comprising a first lag time constant;
   filtering the sensed force using a second lag filter, substantially in parallel with the first filter, to provide a second output, the second lag filter comprising a second lag time constant greater than the first lag time constant;
   comparing with a first threshold value, in a first comparison, a magnitude of a difference between the first output and the second output;
   comparing with a second threshold value, in a second comparison, a magnitude of the second output;
   designating the user input device to have a hands off status based on the first comparison and the second comparison; and
   providing, by a motor mechanism, an applied force to the user input device responsive to designating the user input device to have the hands off status.

2. The method according to claim 1, comprising: monitoring the hands off status for a predetermined time period and declaring a steady state status if the user is designated to have a hands off status for the entire predetermined time period.

3. The method according to claim 1, comprising monitoring a redundant channel for a predetermined time period to provide an independent determination of the hands off status.

4. The method according to claim 2, comprising:
   monitoring a redundant channel for the predetermined time period to provide an independent determination of the hands off status; and
   designating the steady state status based on a combination of the hands off status and the independent determination.

5. The method according to claim 1, wherein designating the user input device to have a hands off status based on the first comparison and the second comparison comprises designating the user input device to have a hands off status if the magnitude of the difference between the first output and the second output is less than the first threshold value and the magnitude of the second output is less than the second threshold value.

6. The method according to claim 1, comprising performing an action based on the hands off status, wherein the action comprises at least one of: initiating an autopilot, initiating a force drift compensation, or indicating to at least one user that the user of the user input device is hands off.

7. The method according to claim 1, wherein the user input device comprises an active stick for control of flight surfaces of an aircraft.

8. A method to calculate a force offset compensation, the method comprising:
   receiving input to an integrator, wherein the input to the integrator is zero if an indication is received that a user is hands on a user input device;
   subtracting a last output from the integrator from a sensed force acting on the user input device to obtain a first subtraction output;

receiving the first subtraction output as input to the integrator; and equating, after a predetermined number of cycles of the integrator, an output of the integrator to be equal to the force offset compensation, wherein the indication that the user is hands on the user input device is provided by:

obtaining, by a force sensor, a sensed force acting on the user input device;

filtering the sensed force, acting on the user input device, using a first lag filter to provide a first output, the first lag filter comprising a first lag time constant;

filtering the sensed force using a second lag filter, substantially in parallel with the first filter, to provide a second output, the second lag filter comprising a second lag time constant greater than the first lag time constant;

comparing with a first threshold value, in a first comparison, a magnitude of a difference between the first output and the second output;

comparing with a second threshold value, in a second comparison, a magnitude of the second output;

designating the user input device to have a hands on status based on the first comparison and the second comparison; and providing, by a motor mechanism and based on the output of the integrator, an applied force to the user input device responsive to designating the user input device to have the hands off status.

9. The method according to claim 8, comprising supplying the output of the integrator to a rate limiter to output a rate limited force compensation.

10. The method according to claim 9, comprising equating the rate limited force compensation to be equal to the force offset compensation after a predetermined number of cycles of the rate limiter.

11. The method according to claim 9, wherein the rate limiter comprises a first initial rate limit for a first duration, and a second rate limit for a second duration, and the first initial rate limit is higher than the second rate limit.

12. The method according to claim 8, comprising subtracting the force offset compensation from the sensed force to obtain a compensated force.

13. An active inceptor comprising circuitry configured to perform the method of claim 8.

14. An active inceptor comprising circuitry configured to perform the method of claim 1.

15. A non-transitory computer readable medium comprising instructions that when executed by one or more processors cause a process to be carried out for detecting a hands off status of a user input device, the process comprising:

obtaining, by a force sensor, a sensed force acting on the user input device;

filtering the sensed force, acting on the user input device, using a first lag filter to provide a first output, the first lag filter comprising a first lag time constant;

filtering the sensed force using a second lag filter, substantially in parallel with the first filter, to provide a second output, the second lag filter comprising a second lag time constant greater than the first lag time constant;

comparing with a first threshold value, in a first comparison, a magnitude of a difference between the first output and the second output;

comparing with a second threshold value, in a second comparison, a magnitude of the second output;

designating the user input device to have a hands off status based on the first comparison and the second comparison; and providing, by a motor mechanism, an applied force to the user input device responsive to designating the user input device to have the hands off status.

16. The non-transitory computer readable medium according to claim 15, the process comprising:

receiving input to an integrator, wherein the input to the integrator is zero if an indication is received that the user is hands on the user input device;

subtracting a last output from the integrator from a sensed force acting on the user input device to obtain a first subtraction output;

receiving the first subtraction output as input to the integrator; and equating, after a predetermined number of cycles of the integrator, an output of the integrator to be equal to the force offset compensation.

17. The non-transitory computer readable medium according to claim 15, wherein designating the user input device to have a hands off status based on the first comparison and the second comparison comprises designating the user input device to have a hands off status if the magnitude of the difference between the first output and the second output is less than the first threshold value and the magnitude of the second output is less than the second threshold value.

18. The non-transitory computer readable medium according to claim 15, the process comprising causing an action to be performed based on the hands off status, wherein the action comprises at least one of: initiating an autopilot, initiating a force drift compensation, or indicating to at least one user that the user of the user input device is hands off.

19. An aircraft including the non-transitory computer readable medium according to claim 15.

* * * * *